(12) United States Patent
Linhart et al.

(10) Patent No.: US 8,006,721 B2
(45) Date of Patent: Aug. 30, 2011

(54) ANTI-KINK DEVICE FOR HOSES, IN PARTICULAR VACUUM CLEANER HOSES

(75) Inventors: Georg Peter Linhart, Wöllstadt (DE); Christian Norbert Linhart, Langgöns (DE)

(73) Assignee: Truplast Kunststofftechnik GmbH, Langgons (DE)

( * ) Notice: Subject to any disclaimer, the term of this patent is extended or adjusted under 35 U.S.C. 154(b) by 132 days.

(21) Appl. No.: 12/483,489

(22) Filed: Jun. 12, 2009

(65) Prior Publication Data

US 2009/0309353 A1 Dec. 17, 2009

(30) Foreign Application Priority Data

Jun. 12, 2008 (DE) .................. 10 2008 027 927

(51) Int. Cl.
*F16L 9/00* (2006.01)
(52) U.S. Cl. .... 138/110; 138/109; 138/121; 138/DIG. 8
(58) Field of Classification Search .................. 138/121, 138/122, 109, 172, 173, 144, DIG. 8; 285/7
See application file for complete search history.

(56) References Cited

U.S. PATENT DOCUMENTS

| 2,713,381 | A | | 7/1955 | Seck ...................... 138/122 X |
| 4,196,031 | A | | 4/1980 | Lalikos et al. ................ 156/143 |
| 4,342,612 | A | | 8/1982 | Lalikos et al. ................ 156/143 |
| 4,599,784 | A | * | 7/1986 | Canu et al. ...................... 29/450 |
| 5,482,089 | A | * | 1/1996 | Weber et al. .................. 138/122 |
| 5,485,870 | A | * | 1/1996 | Kraik ............................ 138/122 |
| 2008/0042433 | A1 | | 2/2008 | Smith ........................... 285/276 |

FOREIGN PATENT DOCUMENTS

DE 200 13 601 U1 3/2001
EP 1 356 756 A1 10/2003

\* cited by examiner

*Primary Examiner* — Patrick F Brinson
(74) *Attorney, Agent, or Firm* — Reising Ethington P.C.

(57) ABSTRACT

An anti-kink device for hoses with an external corrugated structure, in particular for vacuum cleaner hoses, such hoses comprising at least one external groove-like channel which runs in a helical manner. The anti-kink device is formed by a wire coil made from spring steel which is screwed into the groove-like channel from one hose end and is fixed to the hose end. This anti-kink device is applied over the entire hose length or only partially at points of the hose which are at risk of kinking.

10 Claims, 9 Drawing Sheets

ANTI-KINK DEVICE FOR HOSES, IN PARTICULAR VACUUM CLEANER HOSES

FIELD OF THE INVENTION

The invention relates to an anti-kink device for hoses, in particular vacuum cleaner hoses. Such hoses are wound from plastic profiled strips to form at least one external groove-like channel which runs in a helical manner. In the process, there is formed in the axial direction a corrugated structure comprising alternating ribs and grooves which in each case run in a helical manner, so that a groove-like, outwardly open channel is formed between two adjacent ribs. Such hoses have a considerable bending flexibility, as is desirable for example for suction hoses during vacuum cleaner operation.

BACKGROUND OF THE INVENTION

Due to their bending flexibility, however, such hoses tend to kink, particularly at the points of connection to devices such as vacuum cleaner housings, but also when the hose is pulled around corners under considerable tensile load. When this happens, constrictions of the cross section occur, which reduce the suction power. Lasting deformations or damage to the hose may also be caused when kinking occurs.

All the known anti-kink device support the hose from outside, i.e. at the helically running ribs, and are designed as tubular grommets which are fixed to the device and through which the hose is passed. Cage-like supporting structures are also known for this purpose.

Supporting coils made from steel wire have also been proposed, which enclose the hose from outside and run in the opposite direction to that of the helical ribs, i.e. if the ribs are designed in the manner of thread to the left then the windings of the supporting coil run in the manner of a thread to the right. The known anti-kink device lack the stabilizing effect to protect the hose against the tendency to collapse when subjected to bending loads, as a result of which throughflow losses may arise.

What is needed is to provide an anti-kink device for hoses, in particular vacuum cleaner hoses, which can protect the hose at all critical points against kinking and collapsing, without significantly reducing the bending flexibility at these points.

SUMMARY OF THE INVENTION

According to the present invention, there is provided an anti-kink device for hoses, in particular vacuum cleaner hoses, which are wound from plastic profiled strips to form at least one external groove-like channel which runs in a helical manner. The anti-kink device has a wire coil made from spring steel which is screwed into the groove-like channel from one end of the hose, wherein the wire coil is fixed to the end of the hose.

By virtue of the wire coil which lies recessed in the groove-like channel between adjacent ribs, the hose is very effectively reinforced against kinking and collapsing, without significantly impairing its bending flexibility. The wire coil can easily be screwed onto the hose or into the groove-like channel of the hose if the pitch of the wire coil approximately corresponds to the pitch of the helical and groove-like channel with the same thread direction. Since the wire coil is fixed to the end of the hose, it cannot be unscrewed from or pulled off the hose.

The wire coil may extend over the entire length of a vacuum cleaner hose, which is then protected as a whole from kinking. However, the wire coil extends at least over a sub-region of the length of a vacuum cleaner hose. In this case, the length of the wire coil may be designed to correspond approximately to the length of the hose region to be protected against kinking.

Preferably, the axially outer end of the wire coil and one end of the hose are fixed in a sleeve which is pushed or screwed onto the hose and which serves for connecting the hose to a device, for example to a vacuum cleaner housing, or to a hose coupling.

In the context of the invention, there are various possibilities for fixing the hose end and at the same time the axially outer end of the wire coil in the sleeve. For this purpose, the sleeve may comprise an annular chamber which is open towards the hose end and in which the hose end and the axially outer end of the wire coil are inserted and fixed by introducing a suitable adhesive into the annular chamber. To this end, the sleeve is pushed onto the hose end and the windings of the wire coil located thereon.

However, the sleeve may also be provided internally with thread ribs, by which the sleeve is screwed onto the end of the hose, wherein the thread ribs engage in the groove-like channel and are pressed with friction against the end windings of the wire coil and thus fix the latter to the hose.

In addition to this or as the sole fixing measure, at the outer end of the wire coil, the wire end may be bent approximately radially or axially outwards and may engage in a corresponding radial or axial bore of the sleeve. If, in this embodiment, the wire end is introduced into the associated radial or axial bore in the sleeve, the wire coil can be screwed onto the hose by the sleeve until finally the hose end and the end windings of the wire coil have entered the sleeve so as to be fixed by a friction fit.

As an alternative to this, at the outer end of the wire coil, the wire end may be bent approximately radially inwards and, when the wire coil is screwed on, may bear against the hose end as a stop which limits the screw-on travel.

A further fixing variant lies in the fact that the wire coil is wound such that it widens radially in a conical manner with its end windings at its outer end. Due to this design of the coil, the conical end windings of the wire coil are clamped with friction and with considerable retaining forces between the hose and the sleeve when the sleeve is screwed onto the hose end, as a result of which a stronger clamping effect is also brought about between the wire coil and the sleeve.

The axially outer end of the wire coil may also be fixed to a hose end by a sleeve made from a suitable thermoplastic plastic which is injection-molded circumferentially around the hose.

BRIEF DESCRIPTION OF THE DRAWINGS

Further details of the invention will be explained in more detail below with reference to drawings which show examples of embodiments. In the drawings.

DETAILED DESCRIPTION OF THE EXAMPLES OF PREFERRED EMBODIMENTS

Figure 1:
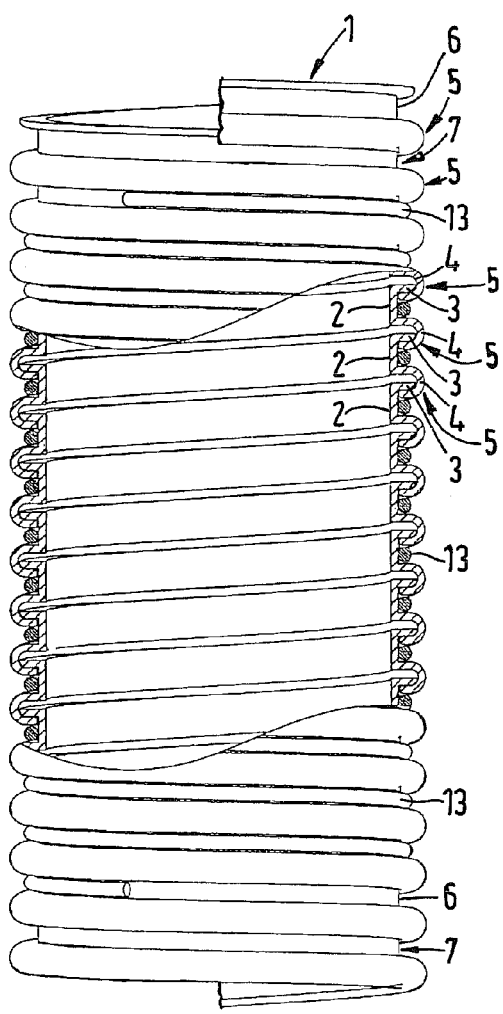
FIG. 1 shows a side view of a single-channel vacuum cleaner hose which is broken off at both ends and is shown in longitudinal section in the middle region, with a wire coil extending over a sub-region of the hose length shown.
Figure 2:
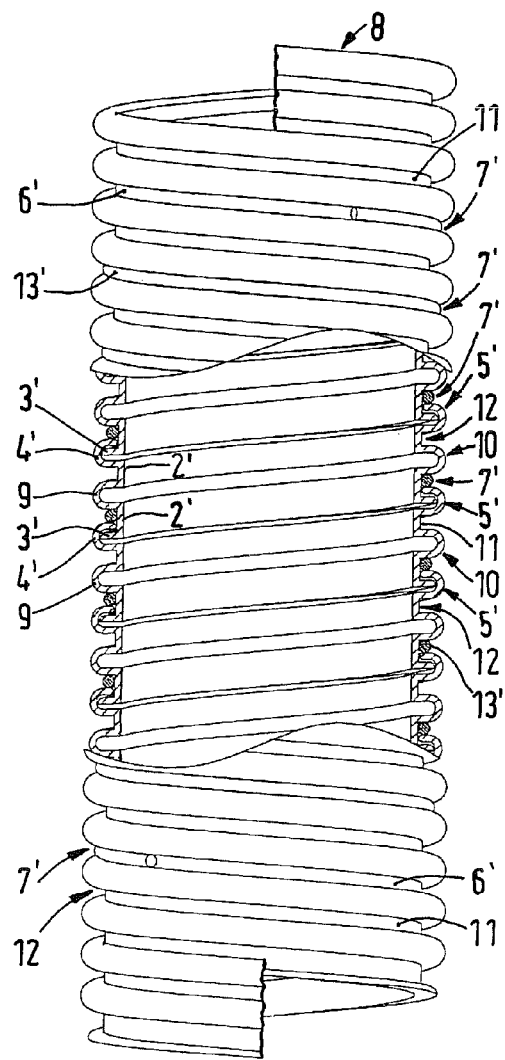
FIG. 2 shows a side view of a double-channel vacuum cleaner hose which is broken off at both ends and is shown in longitudinal section in the middle region, with a wire coil extending over a sub-region of the hose length shown.

Reference will first be made to FIGS. 1 and 2, which show two hose structures which are known per se that can be used as part of a novel anti-kink device described as follows.

The single-channel hose 1 shown in FIG. 1 is wound from a profiled strip comprising a base wall 2 which defines the hose inner wall surface and to one end of which there is connected an outwardly directed web 3 and to the other end of which there is connected an inwardly open U-shaped profile 4. During the winding process to form the hose, the U-shaped profile 4 engages over the adjacent web 3, the surfaces of the web 3 and of the U-shaped profile 4 which bear against one another being securely connected to one another by adhesive bonding or welding. As a result, there is obtained in the axial direction towards the outside a corrugated hose structure with alternating ribs 5 and grooves 6, which in each case run in a helical manner. As a result, a groove-like helical channel 7 is formed between two adjacent ribs 5. On account of this channel 7, such hoses 1 are referred to as single-channel hoses.

The double-channel hose 8 shown in FIG. 2 is wound from a profiled strip comprising two base walls 2' which define the hose inner wall surface and which are connected to one another by a U-shaped profile 9. An outwardly oriented web 3' is connected to the free end of one base wall 2', while an inwardly open U-shaped profile 4' is connected to the free end of the other base wall 2'. During the winding process to form the hose, the U-shaped profile 4' engages over the adjacent web 3', the surfaces of the web 3' and of the U-shaped profile 4' which bear against one another being securely connected to one another by adhesive bonding or welding. As a result, there is once again obtained in the axial direction towards the outside a corrugated hose structure with alternating ribs 5' and 10, wherein the ribs 10 are formed by the U-shaped profile 9. As a result, two helical grooves 6' and 11 are obtained. Accordingly, two groove-like channels 7' and 12 are formed between adjacent ribs 5', 10. On account of these two channels 7' and 12, such hoses are referred to as double-channel hoses.

In the single-channel hose 1 shown in FIG. 1, a wire coil 13 made from spring steel is screwed into the groove-like channel 7 from one hose end, which wire coil provides a sub-region of the length of the hose 1 with effective anti-kink protection. As can be seen, the wire coil 13 has a wire diameter which fits between the ribs 5 and which in the illustrated example is smaller than the depth of the groove-like channel 7, so that the wire coil 13 does not protrude beyond the outer circumference of the hose 1. The wire diameter is mainly predefined by the channel geometry. Here, the width of the channel plays the critical role. The wire diameter should not be larger than the channel width, since otherwise the hose is "blocked".

In the double-channel hose 8 shown in FIG. 2, a wire coil 13' made from spring steel is screwed only into one of the groove-like channels 7' and 12, namely in the illustrated example into the channel 7', from one end of the hose 8. Here, too, the wire coil 13' has a wire diameter which fits between the ribs 5' and 10, but which is smaller than the depth of the groove-like channel 7', so that the wire coil 13' does not protrude beyond the outer circumference of the hose 8.

Although in the double-channel hose 8 shown in FIG. 2 the wire coil 13' is located only in the groove-like channel 7', or alternatively only in the groove-like channel 12, so that the wire coil 13' has a greater pitch than the wire coil 13 shown in FIG. 1, nevertheless an effective anti-kink protection is still achieved as a result. However, a second wire coil (not shown) which corresponds to the wire coil 13' may additionally be screwed into the groove-like channel 12.

Figure 3:
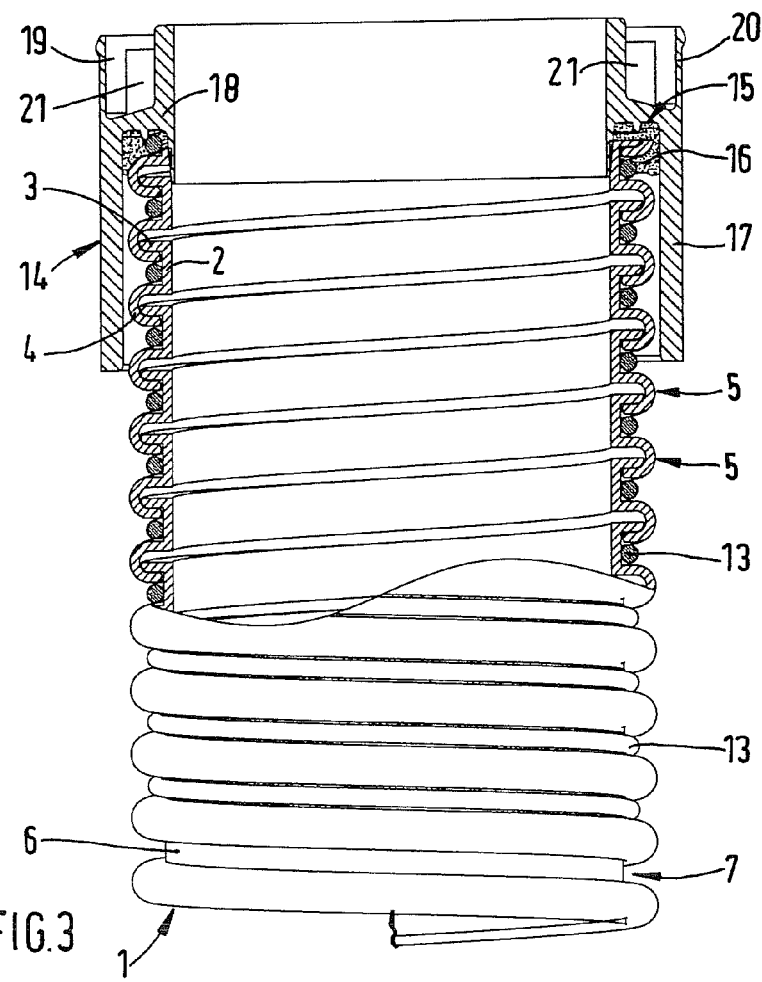
FIG. 3 shows a hose end of a single-channel vacuum cleaner hose which is broken off and shown partially in longitudinal section, with a wire coil and with a sleeve pushed on and fixed by adhesive bonding.
Figure 5:
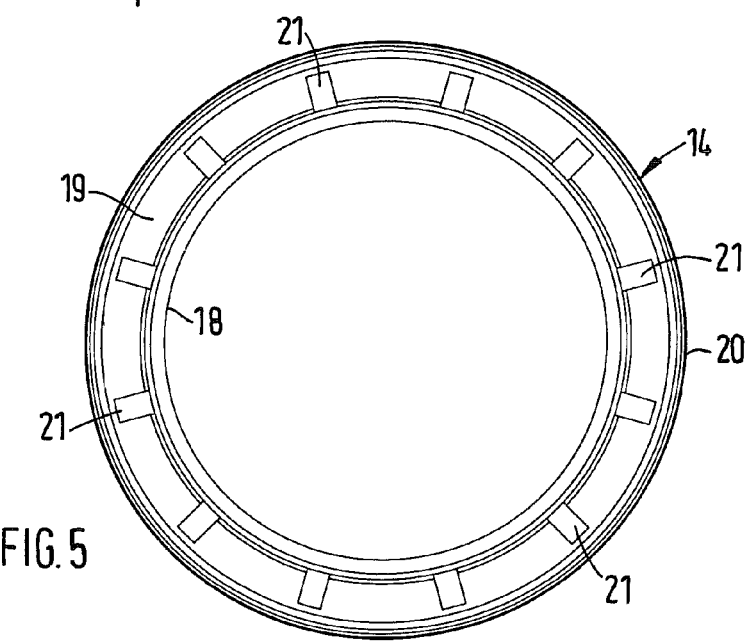
FIG. 5 shows the front view of the sleeve shown in FIGS. 3 and 4.
Figure 4:
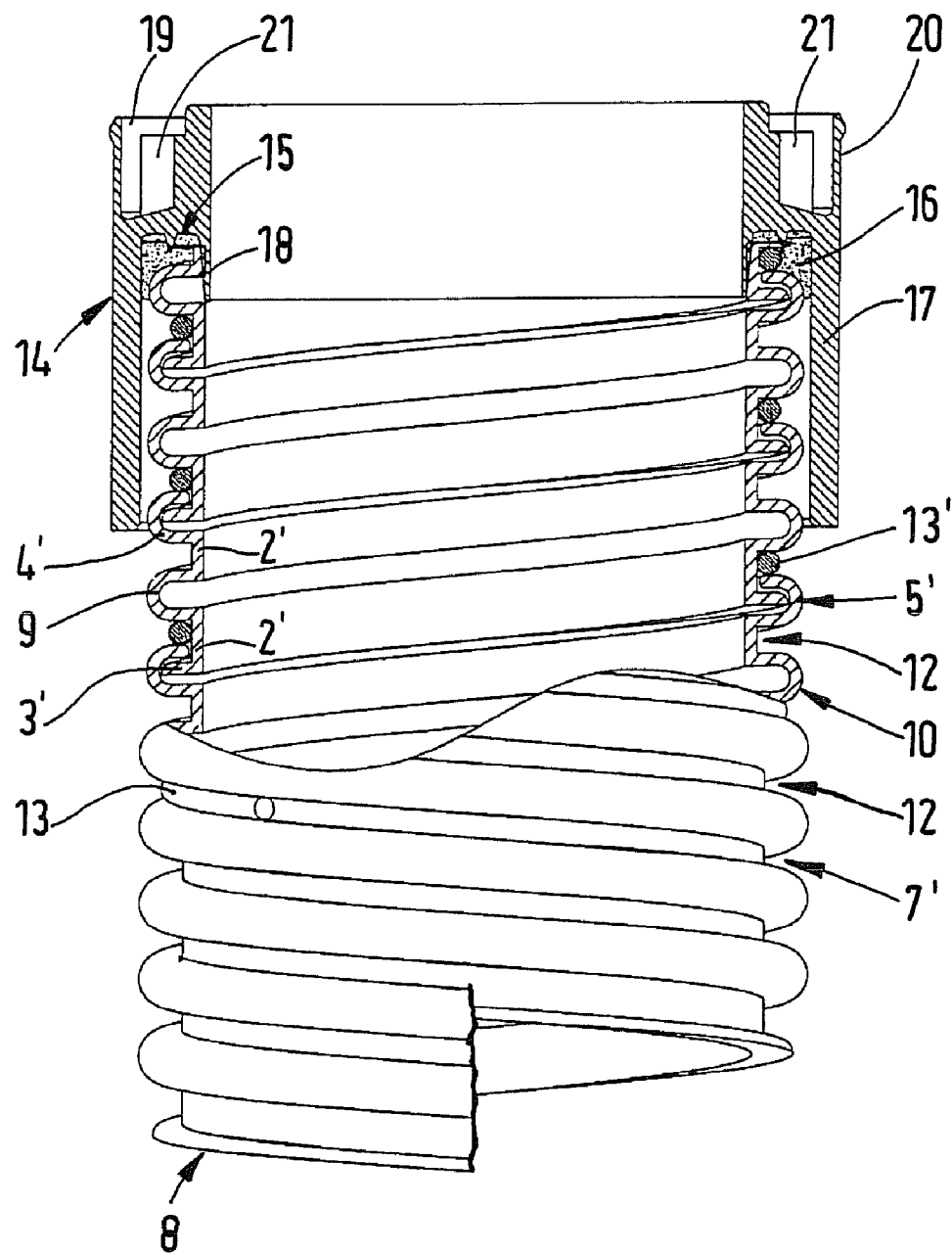
FIG. 4 shows a hose end of a double-channel vacuum cleaner hose which is broken off and shown partially in longitudinal section, with a wire coil and with a sleeve pushed on and fixed by adhesive bonding.

In the examples of embodiments shown in FIGS. 3 to 5, an anti-kink device is provided in conjunction with a sleeve 14 which is pushed axially onto the hose 1 or 8 and the screwed-on wire coil 13 or 13'. The sleeve 14 comprises an annular chamber 15 which is open towards the hose end and in which the end of the hose 1 or 8 and the axially outer end of the wire coil 13 or 13' are fixed by introduction of an adhesive compound 16 into the annular chamber 15. The annular chamber is delimited towards the outside by a hollow-cylindrical sleeve wall 17, which encloses the hose 1 or 8, and towards the inside by an annular wall 18 of the sleeve 14, which more or less adjoins the base walls 2 or 2' of the plastic profiled strip forming the hose. Located on the front side of the sleeve 14 is an annular recess 19, by which forms a flexible annular lip 20 from the sleeve wall 17, which annular lip is provided for the device or coupling connection. Located in the annular recess 19 are a plurality of, in the illustrated example twelve, reinforcing ribs 21 which are connected to the annular wall 18. The sleeve 14 is advantageously injection-molded from a suitable thermoplastic plastic.

The examples of embodiments shown in FIGS. 6 to 10 in each case show an anti-kink device in conjunction with a sleeve 14' screwed onto the hose 1 and the screwed-on wire coil. Here, the sleeve 14' is provided internally with thread ribs 22, by which the sleeve 14' is screwed onto the end of the hose 1. In this case, the thread ribs 22 engage in the groove-like channel 7 and are pressed with friction against the end windings of the wire coil 13, as a result of which said end windings of the wire coil 13 in the examples of embodiments shown in FIGS. 6 to 9 are pressed against the groove bottom of the groove-like channel 7 and thus are fixed to the hose. In this way, the wire coil 13 together with the hose 1 is securely fixed in the sleeve.

Figure 10:
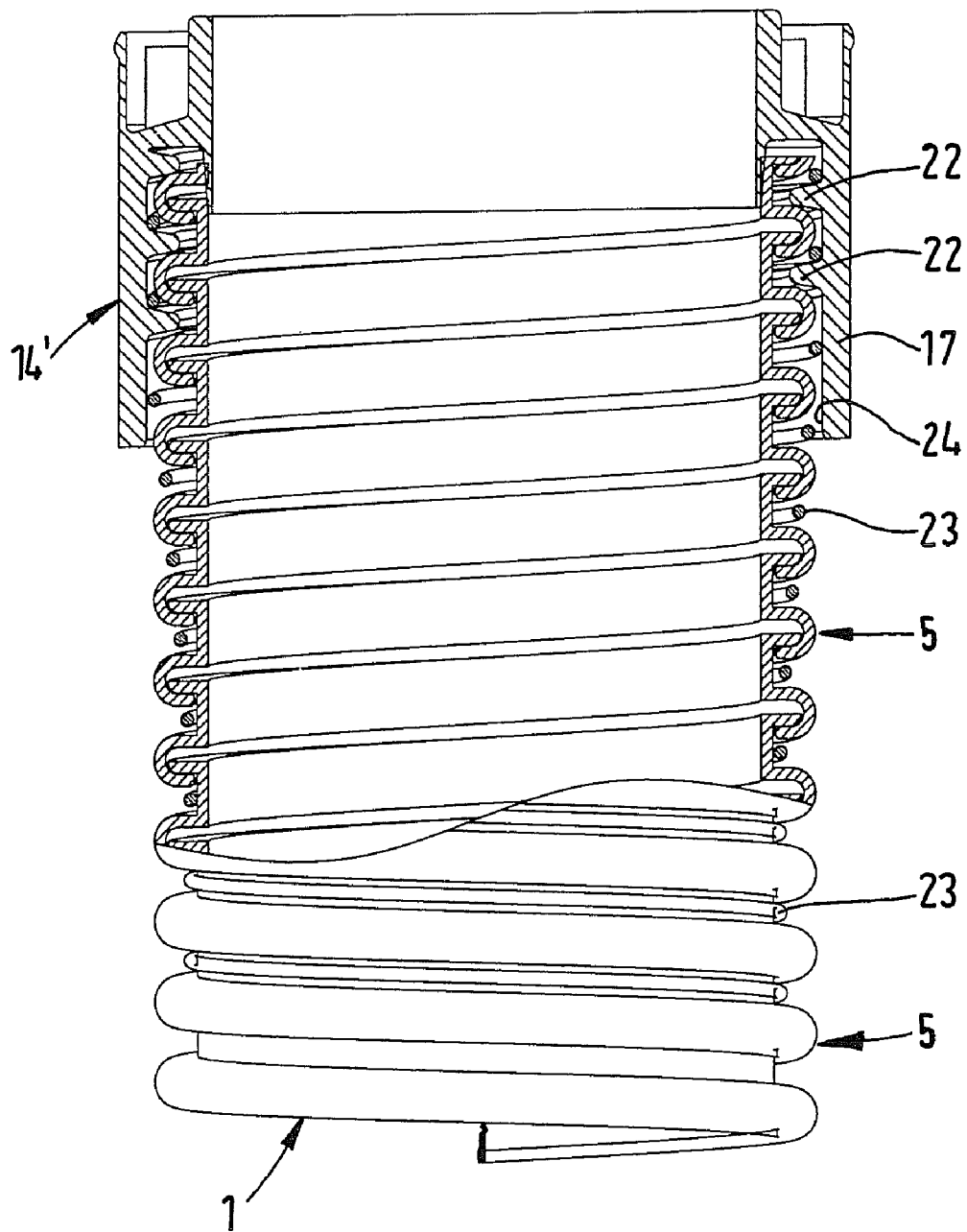
FIG. 10 shows a hose end of a single-channel vacuum cleaner hose which is broken off and shown partially in longitudinal section, with a wire coil, the end windings of which are wound so as to widen radially in a conical manner, and with a sleeve screwed on, FIG. 11 shows a hose end of a single-channel vacuum cleaner hose which is broken off and shown partially in longitudinal section, with a wire coil and with a sleeve injection-molded circumferentially around the hose so as to cover the end windings of the wire coil.

In the example of embodiment shown in FIG. 10, use is made of a wire coil 23 made from spring steel which is wound such that it widens radially in a conical manner with its end windings at its outer end, so that the diameter of the windings continuously increases towards the end of the wire coil 23. As can be seen from FIG. 10, the wire diameter in this wire coil 23 is smaller than in the other examples of embodiments, so that the last windings with an increased diameter are securely clamped between the ribs 5, the inner wall surface 24 of the sleeve wall 17 and the thread ribs 22 when the sleeve 14' is screwed onto the hose 1, as a result of which the sleeve 14' is fixed to the hose end while simultaneously fixing the wire coil 23.

Figure 6:
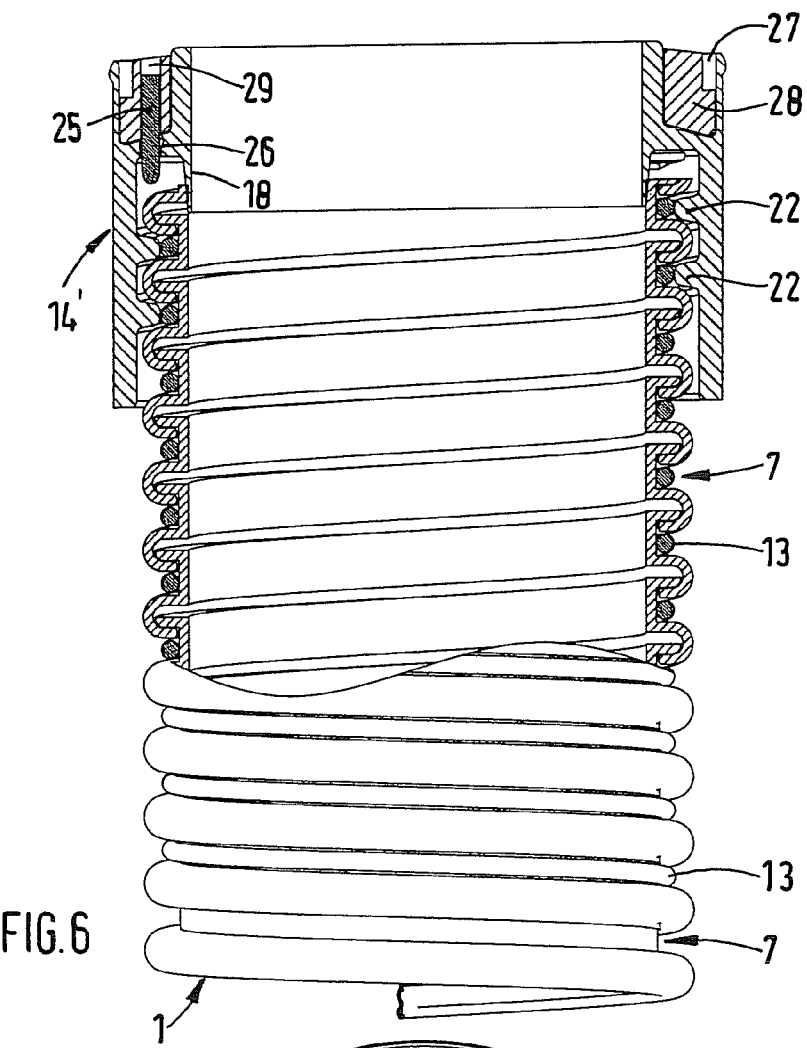
FIG. 6 shows a hose end of a single-channel vacuum cleaner hose which is broken off and shown partially in longitudinal section, with a wire coil and with a sleeve screwed on, with which an axially bent wire end engages in order to fix the wire coil.
Figure 7:
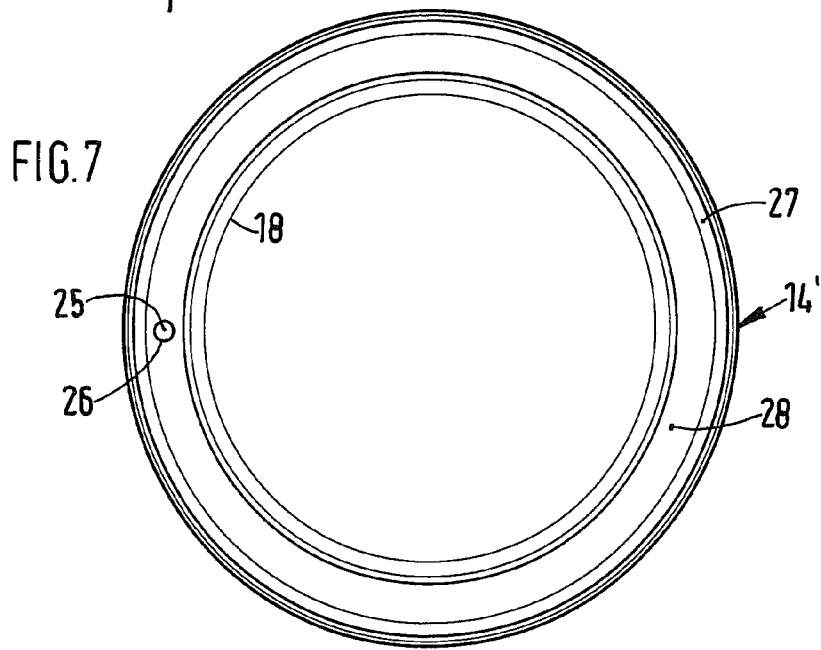
FIG. 7 shows the front view of the sleeve shown in FIG. 6.

In the example of embodiment shown in FIGS. 6 and 7, as an additional securing measure at the outer end of the wire coil 13, the wire end 25 is bent approximately axially outwards and engages in a corresponding axial bore 26 of the sleeve 14'. In this case, there is moreover provided in the front side of the sleeve 14' an annular recess 27, into which a retaining ring 28 can be pressed or glued, which receives the axially bent wire end 25 in a bore 29 when the latter is oriented in such a way as to align with the axial bore 26 in the sleeve 14'.

Figure 8:
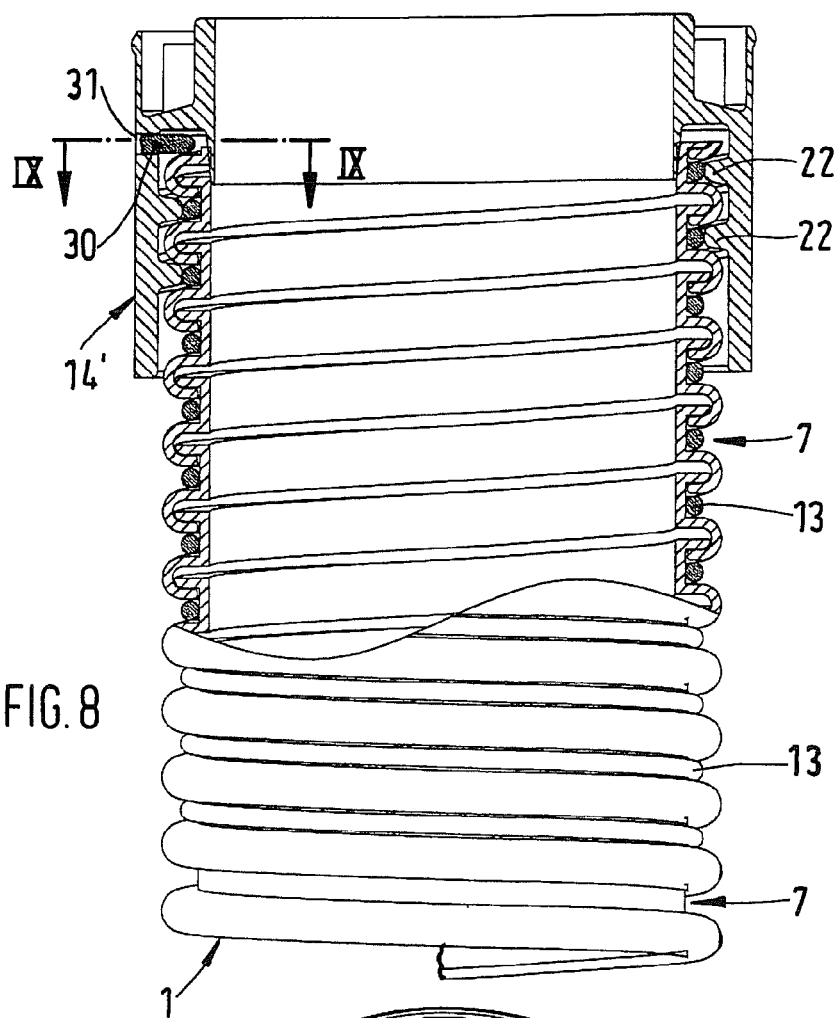
FIG. 8 shows a hose end of a single-channel vacuum cleaner hose which is broken off and shown partially in longitudinal section, with a wire coil and with a sleeve screwed on, with which a radially outwardly bent wire end engages in order to fix the wire coil.
Figure 9:
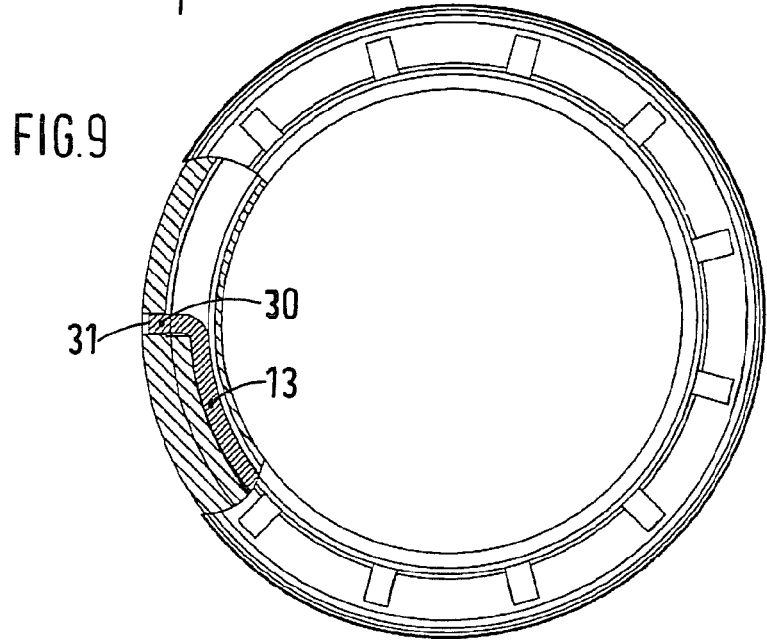
FIG. 9 shows a front view of the sleeve, partially broken open along the section line IX-IX marked in FIG. 8.

The example of embodiment in FIGS. 8 and 9 shows a wire end 30 which is bent approximately radially outwards at the outer end of the wire coil 13, which engages in a radial bore 31 of the sleeve 14' as an additional securing measure.

Figure 11:
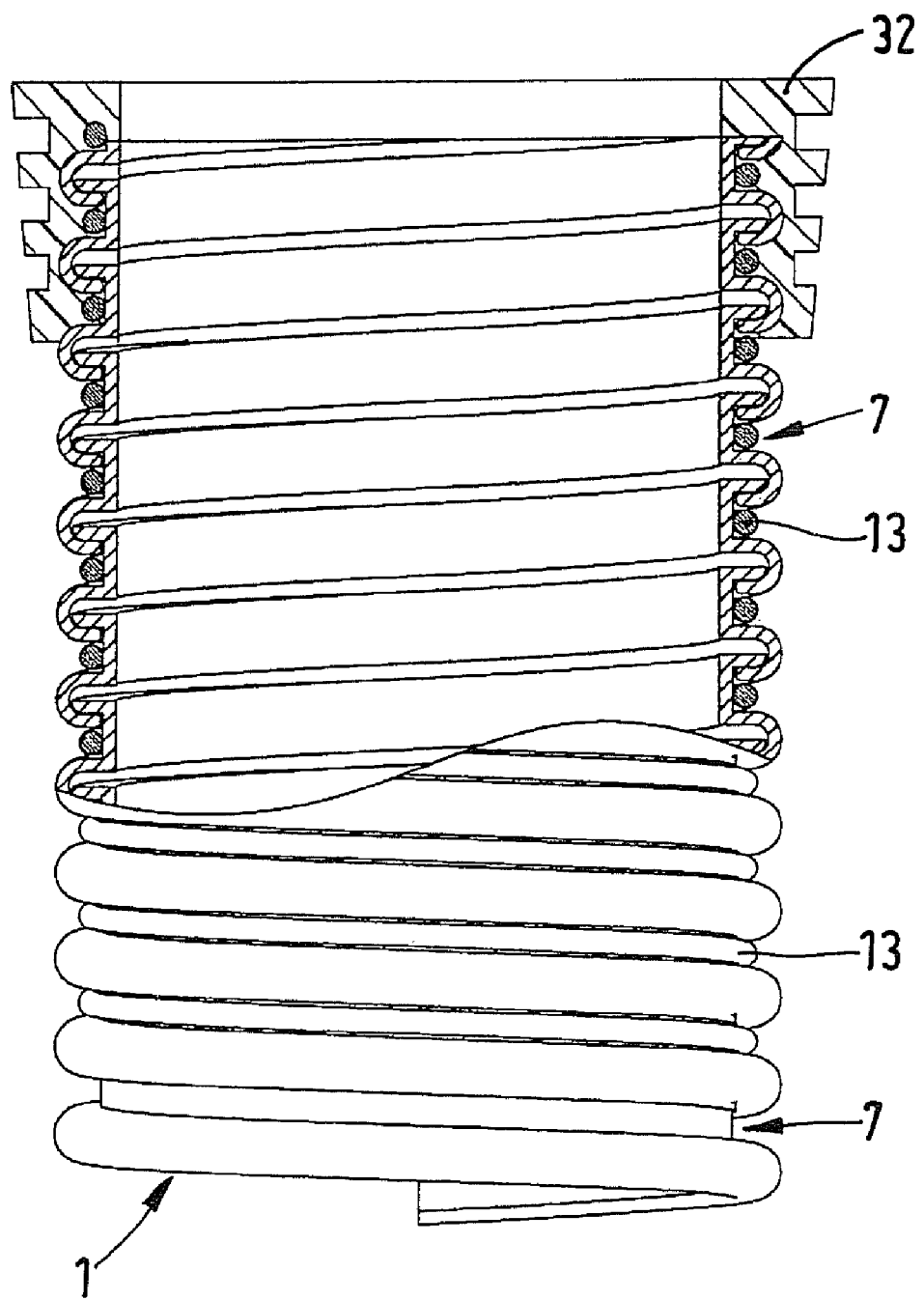

In the example of embodiment shown in FIG. 11, the axially outer end of the wire coil 13 is fixed to the hose 1 by a sleeve 32 injection-molded circumferentially around the hose 1. The sleeve 32 is injection-molded from a suitable plastic, TPE (thermoplastic elastomer) plastics being particularly suitable for this. Here, the end windings of the wire coil 13 which are covered by said sleeve are securely embedded in the groove-like channel 7 and are enclosed by the plastic.

Figure 12:
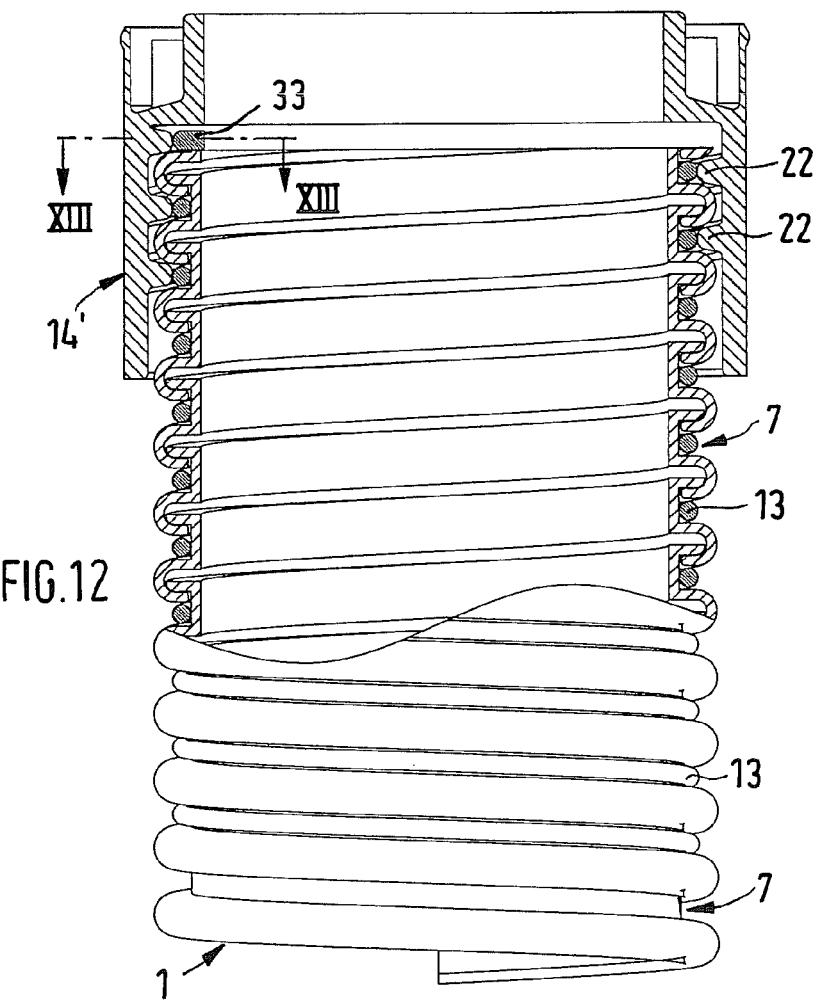
FIG. 12 shows a hose end similar to FIG. 8 which is broken off and shown partially in longitudinal section, but with an approximately radially inwardly bent wire end
Figure 13:
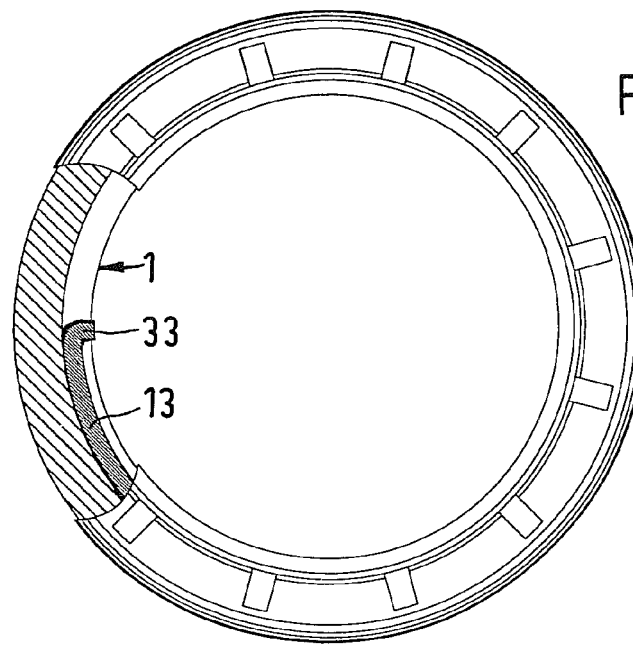
FIG. 13 shows a front view of the sleeve, partially broken open along the section line XIII-XIII marked in FIG. 12.

The example of embodiment shown in FIGS. 12 and 13 differs from the example of embodiment shown in FIGS. 8 and 9 in that, at the outer end of the wire coil 13, the wire end 33 is bent approximately radially inwards. When the wire coil 13 is screwed on, the wire end 33 bears against the hose end as a stop which limits the screw-on travel, as illustrated in the drawings. This prevents the wire coil 13 from being able to be screwed further onto the hose 1 when the sleeve 14' is located on the hose 1.

Figure 14:
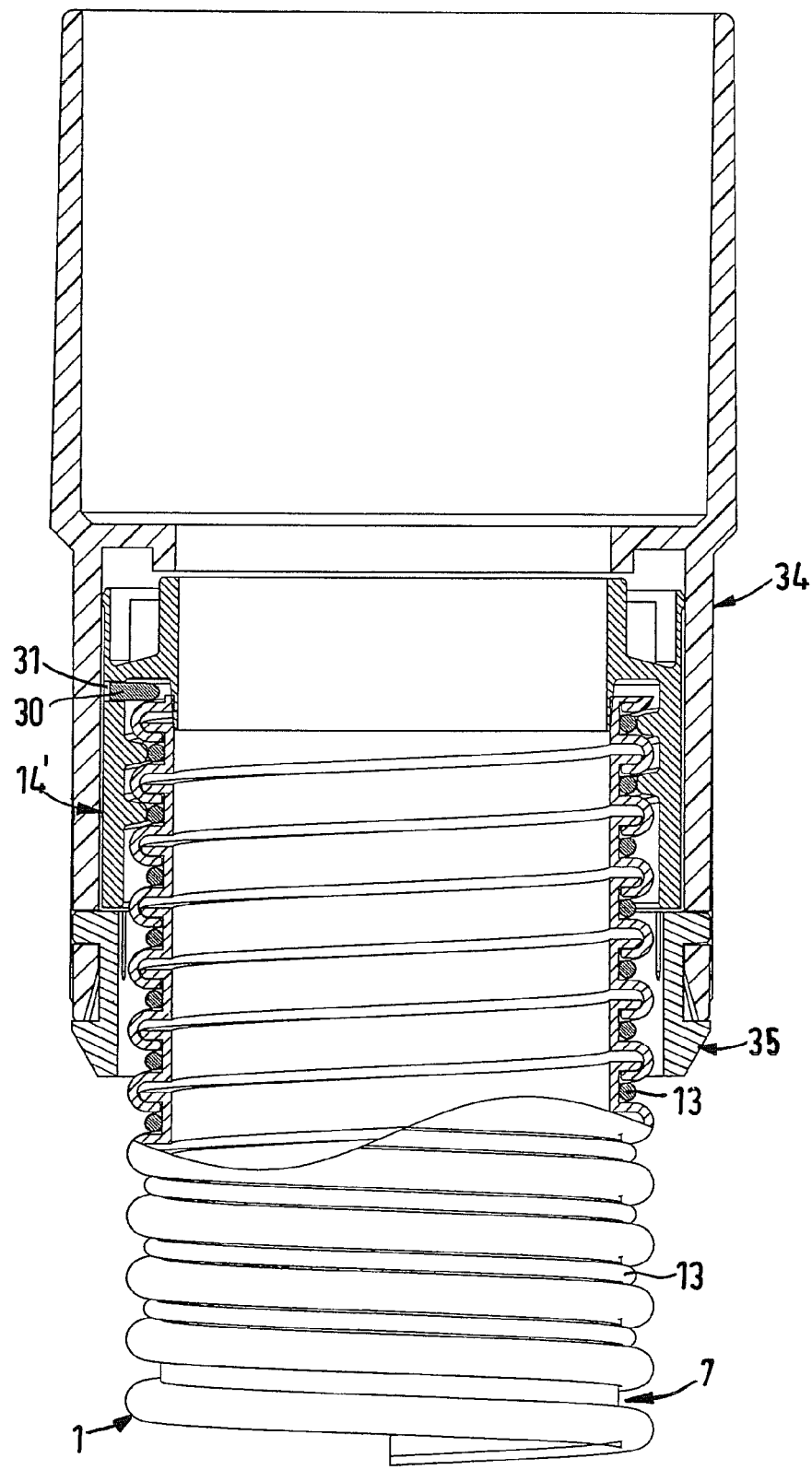
FIG. 14 shows a device connection, shown in longitudinal section, of the hose end shown in FIGS. 8 and 9.

FIG. 14 shows a device connection of the hose end shown in FIGS. 8 and 9. The wire coil 13 is fixed in the screwed-on sleeve 14' in the manner that has already been described, so that it is secured against being unscrewed. The hose 1, the wire coil 13 and the sleeve 14' are mounted such that they can rotate together in a device connection sleeve 34. A so-called click ring 35 prevents the hose 1 together with the screwed-on sleeve 14' and the wire coil 13 from being able to be pulled out of the device connection sleeve 34, since the click ring 35 in this case serves as an axial stop for the sleeve 14'.

In summary, there is described an anti-kink device for hoses with an external corrugated structure, in particular for vacuum cleaner hoses. Such hoses comprise at least one external groove-like channel which runs in a helical manner. The anti-kink device is formed by a wire coil made from spring steel which is screwed into the groove-like channel from one hose end and is fixed to the hose end. This anti-kink device, which is applied over the entire hose length or only partially at points of the hose which are at risk of kinking, does not impair the bending flexibility of the hose.

Variations and modifications are possible without departing from the scope and spirit of the present invention as defined by the appended claims.

We claim:

1. An anti-kink device for a hose such as a vacuum cleaner hose, the hose having two ends and being wound from a plastic profiled strip to form at least one external groove-like channel which runs in a helical manner, said anti-kink device comprising a wire coil made from spring steel which is screwed into the groove-like channel from one end of the hose, and wherein the wire coil is fixed to one end of the hose and wherein the wire coil has an axially outer end and wherein the axially outer end of the wire coil and one end of the hose are fixed within a sleeve which is pushed onto the hose.

2. An anti-kink device according to claim 1, wherein the wire coil extends at least over part of the length of a vacuum cleaner hose.

3. An anti-kink device for a hose of a vacuum cleaner, the hose having two ends and being wound from a plastic profiled strip to form at least one external groove-like channel which runs in a helical manner, said anti-kink device comprising a wire coil made from spring steel which is screwed into the groove-like channel from one end of the hose, and wherein the wire coil is fixed to one end of the hose; and wherein the wire coil has an axially outer end and wherein the axially outer end of the wire coil and one end of the hose are fixed in a sleeve which is screwed onto the hose.

4. An anti-kink device according to claim 1, wherein the sleeve comprises an annular chamber which is open towards one hose end and in which the hose end and the axially outer end of the wire coil are inserted and fixed by introduction of an adhesive into the annular chamber.

5. An anti-kink device according to claim 3, wherein the sleeve comprises an annular chamber which is open towards one hose end and in which the hose end and the axially outer end of the wire coil are inserted and fixed by introduction of an adhesive into the annular chamber.

6. An anti-kink device according to claim 3, wherein the sleeve is provided internally with thread ribs, by introduction of which the sleeve is screwed onto the end of the hose, wherein the thread ribs engage in the groove-like channel and are pressed with friction against the end windings of the wire coil and thus fix the latter to the hose.

7. An anti-kink device according to claims 6, wherein, at the outer end of the wire coil, the wire end is bent approximately in a direction chosen from radially and axially outwards and engages in a corresponding radial and axial bore respectively of the sleeve.

8. An anti-kink device according to claim 6, wherein, at the outer end of the wire coil, the wire end is bent approximately radially inwards and, when the wire coil is screwed on, bears against the hose end as a stop which limits the screw-on travel.

9. An anti-kink device according to claims 6, wherein the wire coil is wound such that it widens radially in a conical manner with its end windings at its outer end.

10. An anti-kink device for a hose of a vacuum cleaner, the hose having two ends and being wound from a plastic profiled strip to form at least one external groove-like channel which runs in a helical manner, said anti-kink device comprising a wire coil made from spring steel which is screwed into the groove-like channel from one end of the hose, and wherein the wire coil is fixed to one end of the hose; and wherein the wire coil has an axially outer end and wherein the axially outer end of the wire coil is fixed to the hose by a sleeve injection-molded circumferentially around the hose.

* * * * *